May 20, 1958 W. J. LEE 2,835,304
TUBELESS TIRE VALVE
Filed Aug. 4, 1954 2 Sheets-Sheet 1

INVENTOR.
WALTER J. LEE
BY
ATTORNEY

May 20, 1958 W. J. LEE 2,835,304
TUBELESS TIRE VALVE
Filed Aug. 4, 1954 2 Sheets-Sheet 2
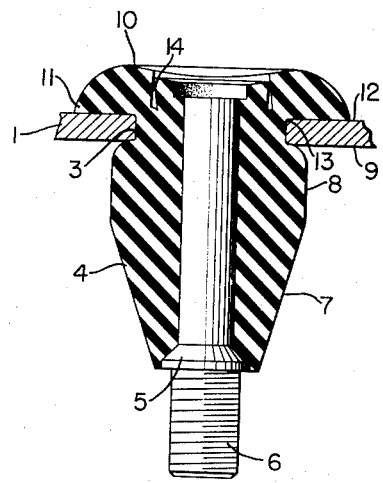
FIG. 6
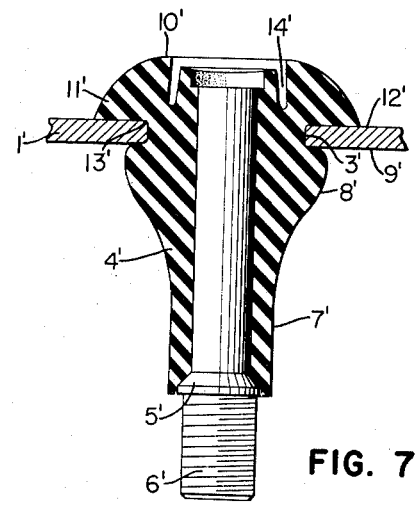
FIG. 7
FIG. 8
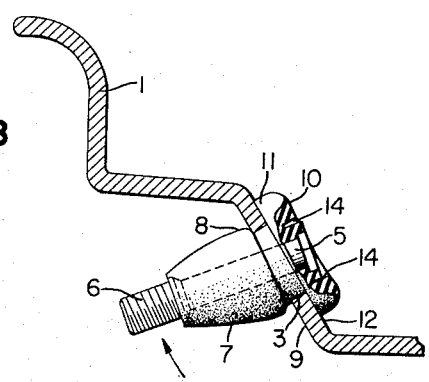
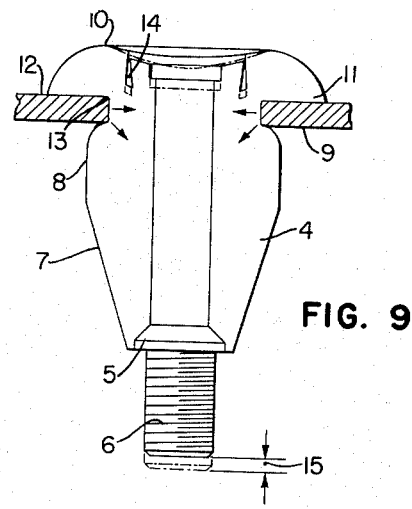
FIG. 9
INVENTOR.
WALTER J. LEE
BY
P. L. Miller
ATTORNEY 2,835,304

TUBELESS TIRE VALVE

Walter J. Lee, Akron, Ohio, assignor to The Goodyear Tire & Rubber Company, Akron, Ohio, a corporation of Ohio Application August 4, 1954, Serial No. 447,709

1 Claim. (Cl. 152—427)

This invention relates to a rubber valve stem and more particularly to a rubber valve stem for use with a tubeless tire and rim assembly.

It is an object of the present invention to provide a rubber valve stem which is easily affixed to and removable from a rim for use with tubeless tires.

Another object of the invention is to provide a self-sealing and self-retaining rubber valve stem for use with a tubeless tire and rim assembly.

Another object of the invention is to provide a rubber valve stem of the type described which retains a seal against the leakage of air through the rim hole under the various forces exerted during operation, particularly centrifugal, axial, vibrational, and bending forces and during extreme variations in temperature.

For a better understanding of the invention reference may be made to the accompanying drawings in which:

Fig. 6 is a cross-sectional view of the valve stem shown in Fig. 1 mounted upon a rim;

Fig. 7 is a cross-sectional view of the valve stem shown in Fig. 2 mounted upon a rim;

Fig. 8 is a cross-sectional view of the valve stem embodying the present invention mounted upon a rim and flexed in a direction indicated by the arrow;

Fig. 9 is a cross-sectional view of the valve stem embodying the present invention showing in phantom lines the valve tube position before permanent set has occurred and in solid lines the valve tube position after peramnent set has occurred.

Figure 1:
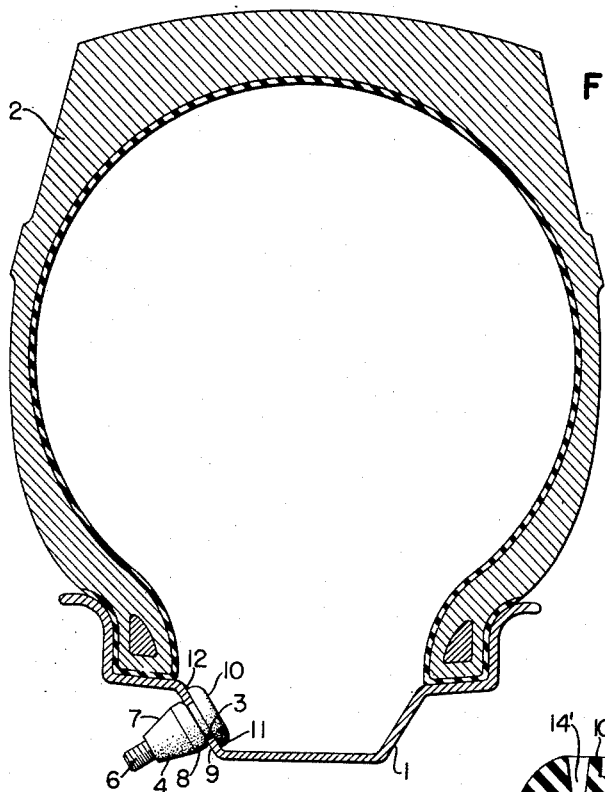
Fig. 1 is a cross-sectional view taken transversely through the tire and rim assembly and longitudinally through the valve stem embodying the present invention.

Referring to Fig. 1 of the drawing the numeral 1 indicates a tire rim upon which is mounted a tubeless tire 2. The rim 1 is provided with a valve hole 3 of standard dimensions through which the valve stem, generally indicated by the numeral 4, projects. The stem 4 is provided with an axial bore having a metal valve insert or valve tube 5 disposed therein and bonded to the stem 4 for a substantial portion of its length. The upper end of the tube 5 projects above the stem 4 and is provided with threads 6 adapted to retain a conventional valve cap.

The valve stem 4 has a barrel portion 7 which gradually tapers or increases in diameter from the thread portion of the tube 5 toward the cylindrical body portion 8. The body 8 of the valve stem 4 bears against the inner periphery 9 of the rim valve hole 3. The base 10 of the valve, or that portion of the valve disposed outwardly of the rim in operation, as shown in Figs. 6 and 7, is provided with a base flange 11 which is considerably larger in diameter than the body portion 8 of the valve stem. The flange or surface 11 bears against the outer surface 12 of the rim adjacent the valve hole. The base 10 and flange 11 are relatively thick, preferably 4 to 6 times thicker than the thickness of the rim which provides sufficient compression to the base to prevent the stem from being pulled out of the rim valve hole manually, thrown out by centrifugal force or forced out by air pressure. The base flange or surface 11 extends radially at an acute angle to a radial plane. When the valve is in operative position, as shown in Fig. 6, the flange 11 is compressed axially into the radial plane passing through the intersection 13 of the flange 11 and the neck 8.

In order to provide a seal between the body portion 8 of the stem and the periphery of the valve rim hole 3, the body portion has an outside diameter between 18 and 40 percent larger than the diameter of the valve rim hole 3 and preferably approximately 23 percent larger. It is, thus, seen that the inner periphery of the valve rim hole 3 and the outer rim surface 12 adjacent the hole 3 are respectively sealed by compression of the body 8 and the base flange 11. Furthermore, as shown in cross section in Figs. 6 and 7, the body portion 8 is in a plane which intersects the tube 5 so that the high compression of the body between the periphery of the valve rim hole and the tube 5 forces or distorts the rubber neck over and around the outer surface 12 of the rim adjacent the valve hole. The valve rim hole is thereby sealed against the leakage of air and flange 11 provides a positive stop tod locate the valve during the mounting operation and hold the valve normally to the rim surfaces.

Figure 2:
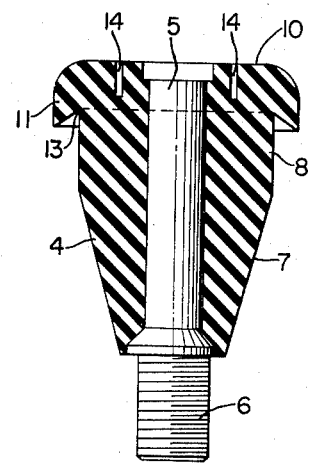
Fig. 2 is a longitudinal cross-sectional view of the valve stem embodying the present invention.
Figure 3:
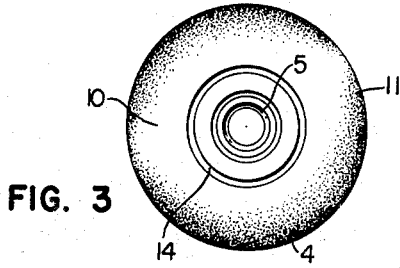
Fig. 3 is a plan view of the base of the valve stem shown in Fig. 2.
Figure 4:
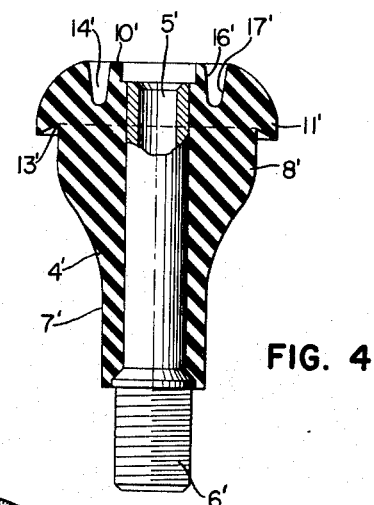
Fig. 4 is a cross-sectional view similar to Fig. 2 of another form of the invention.
Figure 5:
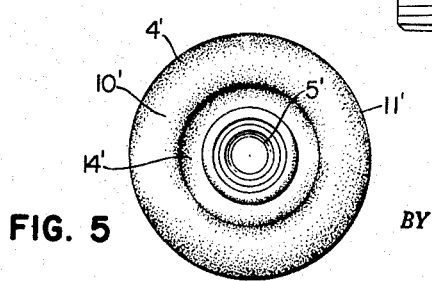
Fig. 5 is a plan view of the base of the valve stem shown in Fig. 4.

The base 10 is further provided with an annular recess or slot 14 extending axially into the base concentrically with the axis to the tube 5. The depth of the groove 14 is at least 50 percent of the distance between the bottom surface of the base 10 and the intersection 13, and as shown in Figs. 2 and 4 the groove terminates within said base, but the groove may extend axially into the plane of the neck 8. The width of the groove is substantially smaller than the depth and is preferably 5 to 30 percent of the body width, or the difference between the radius of the body portion 8 and the radius of tube 5. The recess or groove 14 functions to increase the extensibility of the body 8 and the flexibility of the base 10 to permit proper sealing of the body 8 and flange 11 during the mounting operation, to maintain the seal on the inner and outer surfaces 9 and 12 of the rim during extreme flexing of the valve, and to provide a follow-up force to increase the effective seal after the rubber forming neck 8 has permanently set.

As previously indicated, the groove 14 functions to increase the extensibility of the body 8 to permit proper sealing of the body 8 and flange 11 during the mounting operation. The valve stem is easily applied to the rim 1 by manually inserting the barrel portion 7 into the valve hole 3 from the outer side 12 toward the inner side 9 of the rim 1 until the wider portion of the barrel 7 engages the periphery of the hole. An axial force is then applied to the stem to force the barrel 7 and body 8 through the hole 3 so as to seat the body 8 and flange 11 in and around the valve rim hole 3. The distance between the slot 14 and the body 8 is relatively short so that during the application of the axial force the rubber between the body and slot is elongated at the same time the flange 11 is being seated against the surface 13. After the flange 11 is fully seated, the elongated rubber between the slot 14 and body 8 tends to retract which facilitates and increases the sealing action of the body 8 after the stem is mounted on the rim, the tube 5 and the portion of the rubber base between the tube 5 and slot 14 are depressed relative to the plane of the base 10 as shown in Figs. 6 and 7.

After prolonged use the rubber within the body portion 8, which is under high compression, tends to take on a permanent set and the compressional forces, indicated by the force lines in Fig. 9, which act on the body portion are gradually reduced. The reduction in the compression of the body portion due to permanent set is offset by the present invention because groove 14 allows the tube 5 to move axially toward the base 10 as permanent set of the body 8 gradually occurs, as shown in Fig. 9, in which the solid lines represent the stem after permanent set and the phantom lines represent the stem before permanent set. As the compression in body 8 is reduced, the follow-up force of the rubber base 10 is substantially less than the follow-up force of the barrel 7 and the tube 5 is moved toward the base 10 a measurable distance 15, shown in Fig. 9, to thereby maintain a high degree of compression on body portion 8. Furthermore, should the valve tube 5 be subjected to a flexing force, or forced transversely in a direction shown by the arrow in Fig. 8, the tube 5 pivots about an axis within the plane of the rim. The end of the tube 5 at the base 10 acts to transmit the flexing force to the flange 11, thereby increasing the compression and sealing action thereof on surface 12 in a direction opposite to that in which the force is applied. Furthermore, as shown in Fig. 8, during flexing the groove 14 will be substantially closed or compressed radially in the direction of increased compression of the flange 11 and, conversely, opened or distended in a direction diametrically opposite to the compression which allows the stem to be flexed without disturbing the seal of the flange diametrically opposite the applied force. It is, therefore, imperative that the cylindrical plane of the groove be disposed in a plane substantially displaced from the plane of the tube 5 and body portion 8. Otherwise stated, the diameter of the inner wall 16 of the groove is substantially larger than the diameter of the tube and the diameter of the outer wall 17 of the groove is substantially less than the diameter of the neck 8, preferably less than 70 percent of the diameter of the neck 8.

Referring to Fig. 4 of the drawings, the barrel 7' of the stem 4' is flared outwardly and terminates coextensively with the cylindrical body portion 8'. The base 10' is rounded or dome-shaped in cross section and the annular concentric recess or groove 14' is relatively large in width because the thickness of the base 10' is relatively larger than the thickness of the base 10' shown in Fig. 1.

While certain representative embodiments and details have been shown for the purpose of illustrating the invention, it will be apparent to those skilled in this art that various changes and modifications may be made therein without departing from the spirit or scope of the invention.

I claim:

A valve stem for a tubeless tire rim comprising a metal valve tube bonded to a rubber stem, said stem having a cylindrical body portion for engagement with the valve opening in the rim, said body portion being in a plane which intersects the tube and having a diameter in its unstressed condition 18 to 40% greater than the diameter of said rim opening so that the said body portion is highly compressed by the rim aperture and distorted over the radially outer surface of the rim, said stem having a base wider in diameter than said body and disposed outwardly of the rim in operation, said base having an annular surface for engagement with the radially outer surface of the rim, said rim engaging surface extending at an acute angle to the body portion of the stem, the bottom surface of said base having an annular slot therein extending concentrically with the axis of the valve from the bottom surface of the base of said stem to a depth of at least 50% of the thickness of said base but terminating within said base, said slot having a maximum diameter greater than the diameter of said valve tube but less than the diameter of said body portion, whereby the compression and effective seal of the body portion against the rim hole is maintained as permanent set of the body portion occurs.

References Cited in the file of this patent

UNITED STATES PATENTS

| | | |
|---|---|---|
| 2,225,472 | Franklin | Dec. 17, 1940 |
| 2,272,886 | Wilson | Feb. 10, 1942 |
| 2,634,784 | Tubbs | Apr. 14, 1953 |
| 2,769,476 | Herzegh et al. | Nov. 6, 1956 |